United States Patent
Kumar

(10) Patent No.: US 9,904,575 B2
(45) Date of Patent: Feb. 27, 2018

(54) SYSTEM AND METHOD FOR SELECTIVE TIMER RATE LIMITING

(71) Applicant: Apple, Inc., Cupertino, CA (US)

(72) Inventor: Derek R. Kumar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 927 days.

(21) Appl. No.: 13/895,264

(22) Filed: May 15, 2013

(65) Prior Publication Data
US 2014/0344820 A1 Nov. 20, 2014

(51) Int. Cl.
*G06F 13/24* (2006.01)
*G06F 9/48* (2006.01)
*G06F 13/26* (2006.01)

(52) U.S. Cl.
CPC .......... *G06F 9/4843* (2013.01); *G06F 9/4812* (2013.01); *G06F 13/24* (2013.01); *G06F 13/26* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 5,621,903 A | 4/1997 | Luciw | |
| 5,944,778 A | 8/1999 | Takeuchi | |
| 7,133,941 B2 | 11/2006 | Klein et al. | |
| 7,885,616 B2 | 2/2011 | Plestid et al. | |
| 8,020,161 B2 | 9/2011 | Markov | |
| 8,244,946 B2 | 8/2012 | Gupta et al. | |
| 8,260,996 B2 * | 9/2012 | Wolfe | G06F 9/4812 710/267 |
| 8,504,753 B2 | 8/2013 | Danko | |
| 8,630,213 B2 | 1/2014 | Lee et al. | |
| 8,914,081 B2 | 12/2014 | Zhu et al. | |
| 8,954,632 B2 | 2/2015 | Wang et al. | |
| 9,128,475 B2 | 9/2015 | Barth | |

(Continued)

FOREIGN PATENT DOCUMENTS

| | | |
|---|---|---|
| CN | 102811127 A | 12/2012 |
| TW | I337495 | 5/2008 |
| TW | 200836064 | 9/2008 |

OTHER PUBLICATIONS

PCT Chapter I International Preliminary Report on Patentability (IPRP Chapter I) PCT/US2014/035306 dated Nov. 17, 2015. (6 Pages).

(Continued)

*Primary Examiner* — Henry Tsai
*Assistant Examiner* — Aurangzeb Hassan
(74) *Attorney, Agent, or Firm* — Womble Bond Dickinson (US) LLP

(57) ABSTRACT

A method and apparatus of a device that rate-limits the execution of a timer is described. The device receives a timer that includes an initial execution timer and a timer priority. If the timer priority is low, the device rate-limits the execution of the timer based on a suppression period associated with the timer priority. In order to rate-limit the execution of the timer, the device determines the suppression period based on the timer priority and schedules the timer to execute at the end of the suppression period. The device further schedules the timer to execute at the initial exertion time when the timer priority is high.

17 Claims, 11 Drawing Sheets

(56) References Cited

U.S. PATENT DOCUMENTS

| | | | |
|---|---|---|---|
| 2002/0178282 A1* | 11/2002 | Mysore | H04L 12/5693 709/234 |
| 2003/0008690 A1 | 1/2003 | Guterman | |
| 2003/0212531 A1 | 11/2003 | Kerr | |
| 2005/0125573 A1 | 6/2005 | Klein et al. | |
| 2007/0022238 A1 | 1/2007 | Metsker | |
| 2007/0271401 A1* | 11/2007 | Louzoun | G06F 13/26 710/264 |
| 2008/0045277 A1 | 2/2008 | Plestid | |
| 2008/0066070 A1* | 3/2008 | Markov | G06F 9/4818 718/103 |
| 2009/0183157 A1 | 7/2009 | Tran | |
| 2009/0307715 A1 | 12/2009 | Santamaria et al. | |
| 2010/0077394 A1 | 3/2010 | Wang | |
| 2010/0153765 A1 | 6/2010 | Stemen et al. | |
| 2010/0169683 A1 | 7/2010 | Wang | |
| 2010/0274940 A1* | 10/2010 | Ahmad | G06F 9/4812 710/267 |
| 2011/0158144 A1 | 6/2011 | Sung et al. | |
| 2011/0244792 A1 | 10/2011 | Park et al. | |
| 2012/0291035 A1* | 11/2012 | Barth | G05B 19/0421 718/102 |
| 2013/0157707 A1 | 6/2013 | Hsiao et al. | |
| 2013/0210481 A1 | 8/2013 | Sane | |
| 2013/0297832 A1 | 11/2013 | Ahmad | |
| 2013/0325995 A1 | 12/2013 | Ispas et al. | |
| 2014/0068303 A1 | 3/2014 | Hildebrand | |
| 2014/0095752 A1* | 4/2014 | Cheshire | G06F 13/24 710/262 |
| 2014/0189162 A1 | 7/2014 | Wang et al. | |
| 2014/0195839 A1 | 7/2014 | Chueh | |
| 2014/0215236 A1 | 7/2014 | Heinrich | |
| 2014/0237279 A1 | 8/2014 | Muralldhar et al. | |
| 2014/0344819 A1* | 11/2014 | Kumar | G06F 9/5038 718/103 |
| 2014/0344820 A1* | 11/2014 | Kumar | G06F 9/4843 718/103 |
| 2016/0157092 A1 | 6/2016 | Uy | |

OTHER PUBLICATIONS

PCT International Search Report and PCT Written Opinion of the International Searching Authority for PCT/US2014/035306 dated Jul. 31, 2014.

Mark Russinovich, David A. Solomon, Alex Ionescu, "Windows Internals Part 1 6$^{th}$ Edition", Mar 21, 2012, pp. i-276, XP055101190.

Microsoft Corporation: "Windows Timer Coalescing", Windows Hardware Dev Center Archive, Jan. 20, 2009, pp. 1-9, XP002727534.

Search Report (ROC) Taiwan Patent Application No. 103117038, dated Jan. 1, 2016, 1 page.

David Solomon and Mark Russinovich, Windows Internals Part 1, (6$^{th}$ Edition), Microsoft Press, http://infornan.teikav.edu.gr/~stpapad/WindowsInternalsPart16thEdition.pdf, 2012, 298 pages.

PCT/US2016/023278, "Notification of Transmittal of the International Search Report and the Written Opinion of the International Searching Authority, or theDeclaration" dated Jun. 8, 2016, pp. 15.

* cited by examiner

SYSTEM AND METHOD FOR SELECTIVE TIMER RATE LIMITING

FIELD OF INVENTION

This invention relates generally to operating systems and more particularly to devices for timer management.

BACKGROUND OF THE INVENTION

An operating system is a collection of software that manages device hardware resources and provides common services for computer programs. The operating system is a vital component of the system software in a device. Application programs usually require an operating system to function.

Interrupts are part of an operating system, as the interrupt provides for the operating system to interact with and react to its environment. When an interrupt is received, the device suspends the program(s) that are currently executing, saves the status of each program, and runs computer code associated with the interrupt. In a modern operating system, the kernel of the operating system handles interrupts. Interrupts may come from either the device's hardware or from a running program.

A processor idle state is a low power mode for a computing device that contains at least one processor. When a computing device enters the processor idle state, the processor clock is inactive so that the processor cannot execute instructions, and at least parts of the processor are powered down. This enables the computing device to operate at a reduced power level.

The operating system uses a time-driven interrupt, called a timer, to trigger periodic activity. Each timer generates an interrupt that is handled by the operating system. The number of interrupts generated by the operating system generally increases as the device runs more application programs and as these application programs utilize more device hardware resources. Consequently, the device will be interrupted more frequently and have fewer opportunities to enter or remain in a sleep mode, a processor idle state, or another low power mode. Accordingly, techniques for allowing a device to remain in a low power mode for longer periods of time in order to reduce power consumption while still providing timers are desirable.

SUMMARY OF THE DESCRIPTION

A method and apparatus of a device that coalesces the execution of multiple timers by scheduling the timers using a scheduling window is described. In an exemplary embodiment, the device receives multiple timers, where each of the timers includes an initial execution time and a latency time. The device further determines a scheduling window for each of the timers based on the initial execution time and the latency time for that timer. The device selects a coalesced execution time that is within the scheduling window of one or more of the timers. The device further coalesces the execution of the multiple timers by scheduling each of the timers to execute at the coalesced execution time.

In a further embodiment, a method and apparatus of a device that coalesces multiple timers by opportunistic execution of these timers is described. The device detects an opportunistic execution trigger event. In response to the detection of the opportunistic execution trigger event, the device receives multiple timers, where each of the timers includes an initial execution time and a latency time. The device further selects a subset of the timers to execute based on the initial execution time for each of the timers, the latency time for each of the timers, and the opportunistic execution trigger event. The device additionally coalesces the execution of the subset of timers by scheduling each of the subset of timers to execute in response to a detection of the opportunistic execution trigger event.

In one embodiment, each of the received timers is a software timer. In one embodiment, each timer further includes a timer priority. The device further determines the latency time for one of the timers based on the timer priority of that timer. In one embodiment, each timer is associated with a task and the timer priority for each timer is based on the task priority of the associated task. In one embodiment, the latency time of a timer is the amount of time that the execution of that timer can be delayed.

In another embodiment, a method and apparatus of a device that rate-limits the execution of a timer is described. The device receives a timer that includes an initial execution timer and a timer priority. If the timer priority is low, the device rate-limits the execution of the timer based on a suppression period associated with the timer priority. In one embodiment, in order to rate-limit the execution of the timer, the device determines the suppression period based on the timer priority and schedules the timer to execute at the end of the suppression period. In one embodiment, different suppression periods are associated with different timer priorities. In addition, the device schedules the timer to execute at the initial exertion time when the timer priority is high.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
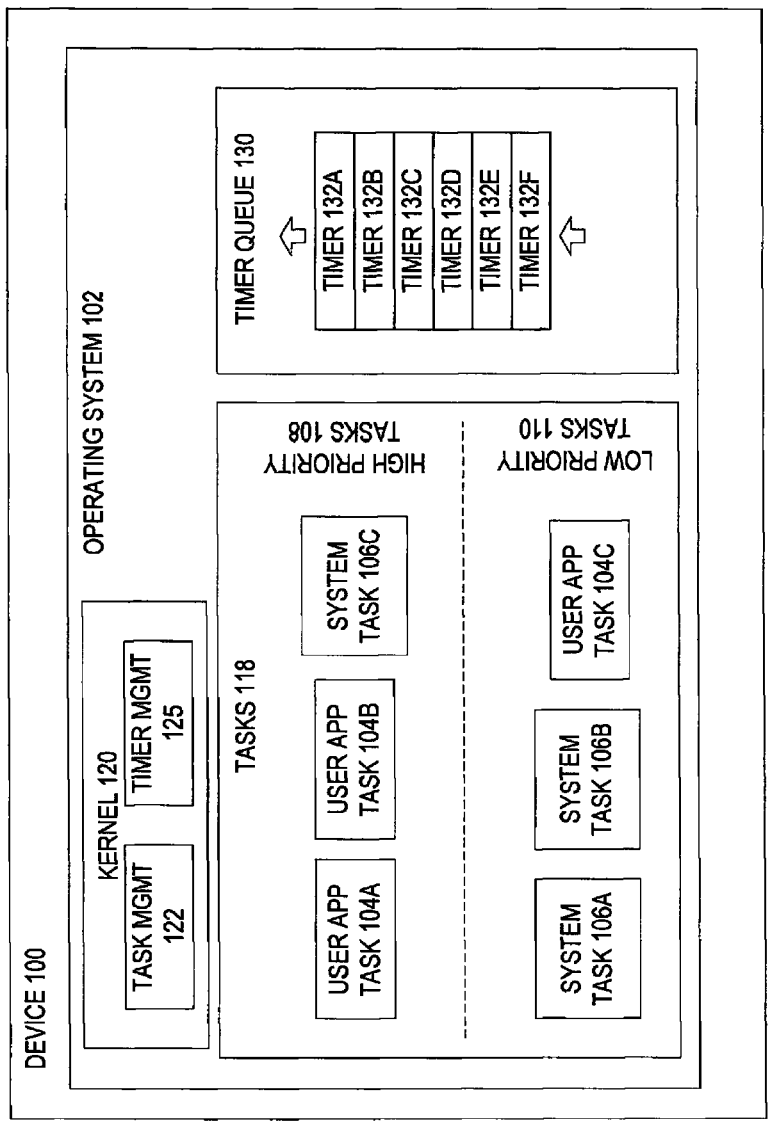
FIG. 1 is a block diagram of one embodiment of a device that coalesces and rate-limits the execution of timers.

A method and apparatus of a device that coalesces and rate-limits the execution of timers is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose device or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that manages the execution of timers in order to reduce power consumption of the device is described. In one embodiment, a timer execution can cause an interrupt on the device. Frequent interrupts can further keep the device from entering or remaining in a low power mode (e.g., processor idle state), which can increase the power consumption of the device. In addition, the operational overhead of the device increases with frequent interrupts and the switching between high and low power modes of the device. In one embodiment, the device coalesces the execution of the timers based on the scheduling windows of the timers in order to reduce the number of interrupts invoked by the timers. In another embodiment, the method and apparatus of a device opportunistically executes timers in response to detecting an opportunistic execution trigger event in order to reduce the number of interrupts invoked by the timers. In yet another embodiment, the method and apparatus of a device rate-limits the execution of the timers so that lower priority timers execute less frequently and invoke less interrupts on the device.

FIG. 1 is a block diagram of one embodiment of a device 100 that coalesces and rate-limits the execution of timers. In one embodiment, the device 100 can be a desktop computer, server, smartphone, laptop, personal digital assistant, music playing device, gaming device, or any other device that can execute multiple processes. In FIG. 1, device 100 includes an operating system 102 that is a set of software used to manage device hardware resources and provides common services for other running computer programs, such as application programs. The operating system 102 includes a kernel 120 and a timer queue 130, and manages several tasks 118.

In one embodiment, the operating system 102 manages several running tasks 118 by scheduling a processor of the device 100 to execute each of the running tasks. The tasks 118 include two categories: high priority tasks 108 and low priority tasks 110. As illustrated in FIG. 1, the high priority tasks 108 include user application tasks 104A and 104B, and a system task 106C. The low priority tasks 110 include system tasks 106A and 106B, and a user application task 104C.

In one embodiment, a task is a process that is an instance of a computer program that is being executed. In this embodiment, the task may be a user application that is executing as a result of user input. Another example of a task is a system process that provides one or more services to a user application, another system process, other process, etc. For example, in one embodiment, a system process gives a status of wireless hotspot service, lists installed applications, facilitates a search, monitors and adjusts device power settings, etc. In another embodiment, a task is a thread that is the smallest sequence of programmed instructions that can be managed independently by an operating system scheduler. In one embodiment, a thread is contained inside a process. Multiple threads can exist within the same process and share resources such as memory, while different processes do not share these resources.

In one embodiment, some tasks may have a higher or lower priority than other tasks. A task priority is a property that indicates the urgency with which that task is scheduled to run (or execute) when there are many tasks that need to be run. This task priority is used by the operating system to schedule when a task is to be executed and how fast the task is to be executed. In one embodiment, a task with a higher priority than other tasks would consume a greater amount of the device resources (e.g., processor resources, etc.). In one embodiment, the operating system assigns high task priorities to tasks having high quality of service requirements (e.g., fast service response time) and assigns low task priorities to tasks having low quality of service requirements.

In one embodiment, the priority may be assigned based on a range of numbers from a lowest priority to a highest priority. For example and in one embodiment, a priority range could range from one to ten, 0-127, low/high, or another range of values.

In one embodiment, user application tasks 104A and 104B could be running in the foreground, while system tasks 106A and 106B running in the background at a priority lower than user application tasks 104A and 104B. A task running in the foreground is a task that is interacting with a user or a task performing real-time operations. A task running in the background is a task that is neither interacting with the user nor performing real-time operations. For example and in one embodiment, a user application task 104A running in the foreground on device 100 may be a user application that is displayed on an output device of the device 100. In this embodiment, the device 100 can concurrently run one or more system tasks that are not displayed on the device and are instead communicating with other tasks. These system tasks would be executing in the background and not directly visible to the user. In another embodiment, the background tasks may be partially or fully viewable, but are not the focus of the device user interface.

In one embodiment, the priority of a task can be changed during the execution of the task. For example and in one embodiment, if the user application task 104A running in the foreground requires the service of the system task 106C, the operating system 102 promotes the system task 106C to become a high priority task in order to prevent the execution speed of user application task 104A from being slowed down. For example and in one embodiment, the operating system 102 will promote a system task managing a hard disk of the device to high priority when a user application running in the foreground requires access to the hard disk. In another example and in another embodiment, when a user application task 104C is no longer interacting with the user or its user interface (UI) is occluded by the UI of another task, the operating system 102 degrades the user application task 104C to a lower priority task.

In one embodiment, the operating system 102 manages the timer queue 130. The timer queue 130 is a timer collection. In one embodiment, the timer queue 130 is implemented as a sorted doubly linked list. A person skilled in the art would recognized that the timer queue 130 can be implemented in many different data structures, such as stack, queue, binary tree, hash table, heap, etc.

A timer provides the operating system 102 with a time-driven interrupt source to trigger periodic activity. In one embodiment, a timer is programmed to expire based on the interrupt interval associated with the timer. If the timer is programmed at system time 0 millisecond and has an interrupt time of 10 milliseconds, the kernel 120 would program the timer to expire at system time equals to 10 milliseconds. The timers can be digital counters that either increment or decrement at a fixed frequency, which can be configurable, and interrupt the processor when reaching zero.

In another embodiment, a timer is programmed to expire periodically based on the interrupt interval associated with the timer. If the timer has an interrupt interval of 10 milliseconds, the kernel 120 would program the timer to expire every 10 milliseconds after the timer is set up. This means the timer interrupts the device every 10 milliseconds.

A device interrupt is a signal to the device 100 emitted by hardware or software indicating an event that needs immediate attention. The device 100 responds by suspending its current activities, saving its state, and executing code called an interrupt handler (or interrupt service routine, ISR) to deal with the event. If the device 100 is in the processor idle state, the device 100 will transition itself to a power mode higher than the processor idle state to handle the event. In one embodiment, the device 100 would transition from a processor idle state to a normal operating mode to handle the associated event. A non-timer device interrupt is a device interrupt that is not caused by the firing of a timer (e.g., a hardware interrupt).

The kernel 120 includes a task management module 122 and a timer management module 125. In FIG. 1, and in one embodiment, the kernel 120 handles the tasks 118 and the timer queue 130. In another embodiment, the kernel 120 handles the tasks 118 using the task management module 122 and handles the timer queue 130 using the timer management module 125.

In another embodiment, the timer management module 125 manages the timer queue 130 and the corresponding timers stored in the timer queue 130. For example and in one embodiment, the timer management module 125 enqueues and dequeues each timers. In addition, the timer management module 125 schedules the execution time for each timer and executes the timers at their corresponding execution times. The timer management module 125 coalesces and rate-limits the execution of multiple timers in order to keep the device in the low-power mode for longer periods of time, therefore reducing power consumption.

Figure 2:
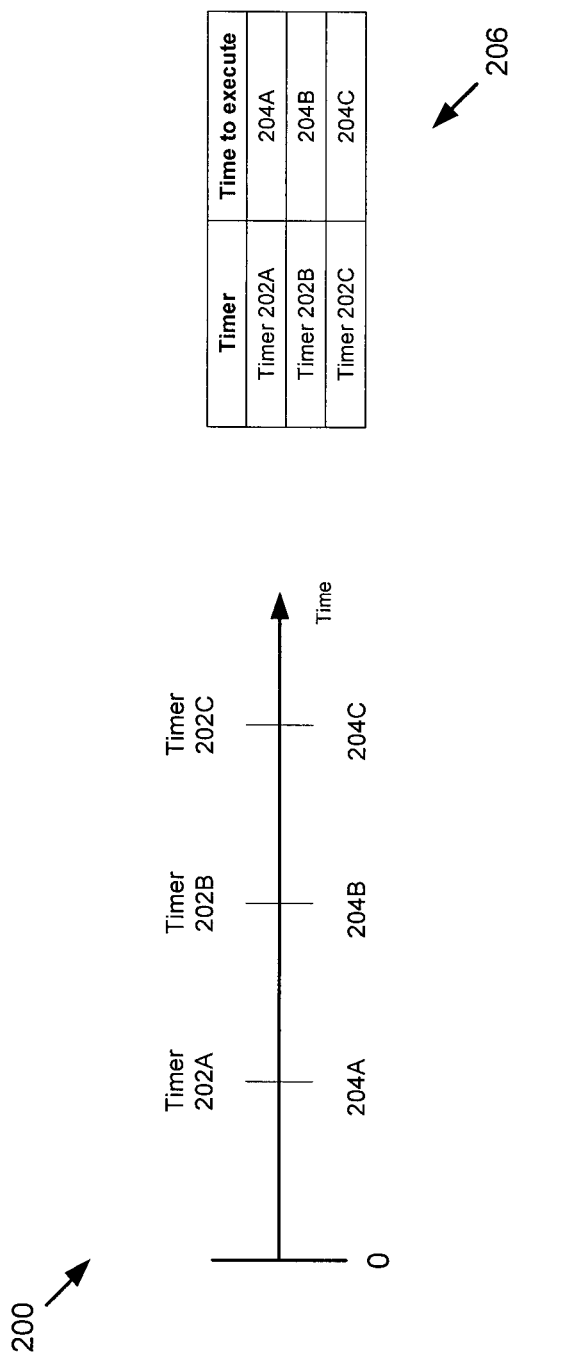
FIG. 2 (prior art) illustrates an approach for executing timers.

FIG. 2 (prior art) illustrates a timeline 200 for executing timers 202A-C. Specifically, FIG. 2 illustrates three timers 202A-C scheduled to execute on a fixed schedule. As shown in the timer attribute table 206 and on the timeline 200, there are three timers 202A-C that are scheduled to execute at three different times 204A-C, respectively. The execution time for each timer is fixed because each of the timers 202A-C has a fixed time in which this timer expires and the operating system executes the interrupt service handler for the interrupt that corresponds to this timer. In one embodiment, since the execution time of the timers is fixed, the execution of timers 202A-C will causes three separate interrupts to the device. In this embodiment, if the device enters a low power mode (e.g., processor idle state) in between each timer expiration, the device will wake up three times to deal with these interrupt requests when the device is under the low power mode. These transitions between different operating modes of the device force the device to spend less time under the low power mode and increase the power consumption of the device. Moreover, the frequent switching between different modes increases operating overhead and power consumption of the device.

Figure 3:
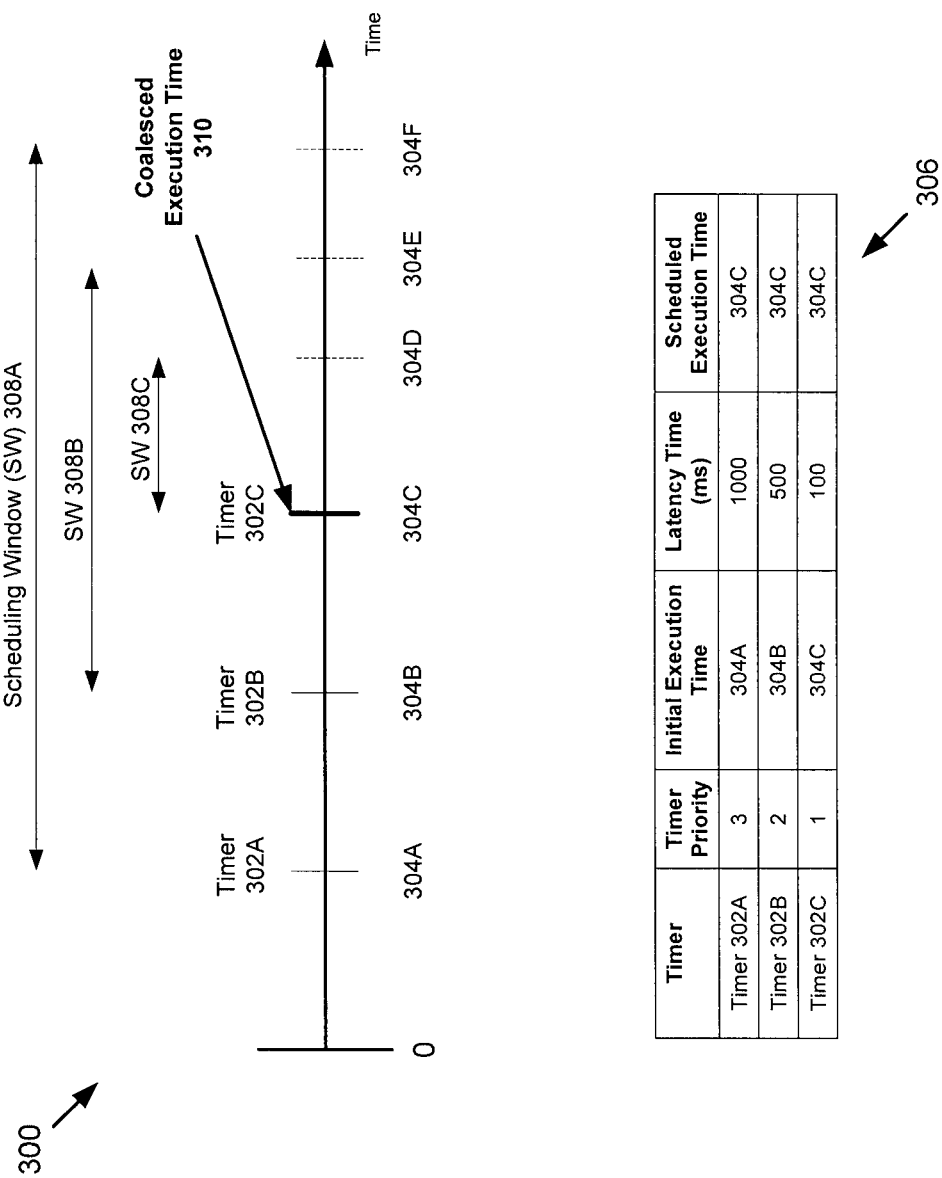
FIG. 3 illustrates in one embodiment coalescing timers by scheduling the timers using a scheduling window.

In order to keep the device in the low power mode for longer periods of time to reduce power consumption, the operating system can manage the execution of the timers to minimize the number of interrupts caused by the timers. FIG. 3 illustrates a timeline 300 for coalescing the timers 302A-C by scheduling these timers 302A-C using scheduling windows 308A-C for each of these timers 302A-C in one embodiment. In FIG. 3, these timers 302A-C can be coalesced by defining a scheduling window 308A-C for each timer 302A-C based on a latency time associated with the timer. In one embodiment, a scheduling window defines a time range in which the operating system can delay the execution of the timer. In this embodiment, the scheduling window for each timer 302A-C is the time range between the scheduled execution time and the scheduled execution time plus the latency time. FIG. 3 identifies several different points of time 304A-F on the timeline 300.

As illustrated in the timer attribute table 306, there are three timers 302A-C. Each of the timers 302A-C has a timer priority, an initial execution time, a latency time, and a scheduled execution time. For example and in one embodiment, timer 302A has a timer priority of 3, an initial execution time of 304A, a latency time of 1000 milliseconds, and the scheduled execution time is at time 304C. In this embodiment, the timer 302A has a scheduling window 308A that spans from times 304A to 304F, which is a time range of 1000 milliseconds. Thus, the operating system can execute the timer 302A between times 304A to 304F.

In one embodiment, the timer priority is the priority assigned to the timer. In one embodiment, the assignment of timer priority is based on the priority of the task that the timer is associated with. For example and in one embodiment, if a timer is associated with a high priority task, a high timer priority will be assigned to this timer. If a timer is associated with a low priority task, a low timer priority will be assigned to this timer. In another embodiment, the assignment of timer priority is not based on the priority of the task that the timer is associated with and instead is based on the operations associated with that timer. For example, a low priority task can start a real-time operation (e.g., playing audio signals) that requires associated timers to have high timer priority. In one embodiment, the higher priority a timer has, the smaller value the operating system assigns to that timer as timer priority. For example, timer 302C has a timer priority of 1, which is less than the timer priority of timer 302A. Therefore, timer 302C has a higher priority than timer 302A.

The initial execution time is the time when the timer management module initially schedules the timer to execute. However, instead of having a fixed execution time for each timer, the timer management module allows the execution of each time to be delayed for up to a latency time that starts to run at the initial execution time. Therefore, the timer management module can execute a timer at any time between the initial execution time and the initial execution time plus the latency time. The time range between the initial execution time and the end of the latency time is called a scheduling window for the timer. For example, timer 302B has an initial execution time at 304B and a latency time of 500 milliseconds. The latency time of timer 302B starts at 304B, lasts for 500 milliseconds, and ends at 304E. Therefore, the time period between 304B and 304E is the scheduling window 308B for the timer 302B. Similarly, the time period between 304A and 304F is the scheduling window 308A for the timer 302A, the time period between 304C and 304D is the scheduling window for the timer 302C.

In one embodiment, the operating system determines the length of the latency time based on the timer priority. The higher priority the timer has, the shorter latency time is assigned to the timer. For example, because the timer 302C has a higher timer priority than timers 302A and 302B, the operating system assigns the timer 302C a latency time of 100 milliseconds, which is shorter than the latency times of timers 302A and 302B. Similarly, the operating system assigns the timer 302B a latency time of 500 milliseconds, which is shorter than the latency time of the timer 302A (1000 milliseconds), because the timer 302B has a higher priority than the timer 302A.

Because each timer has a scheduling window rather than a fixed execution time, the timer management module is able to select an execution time that is within the scheduling windows of multiple timers and schedule those timers to execute at the same selected execution time. For example and in one embodiment, because time 304C is within the scheduling windows 308A-C of timers 302A-C, the timer management module can select time 304C as the coalesced execution time 310 and schedule the timers 302A-C to execute at the coalesced execution time 310. By coalescing the execution of the timers 302A-C using the scheduling windows 308A-C, instead of invoking multiple interrupts, the operating system invoke one interrupt to process those multiple timers. As a result, the device can stay in the low power mode for longer periods of time and power consumption of the device is reduced.

Figure 4:
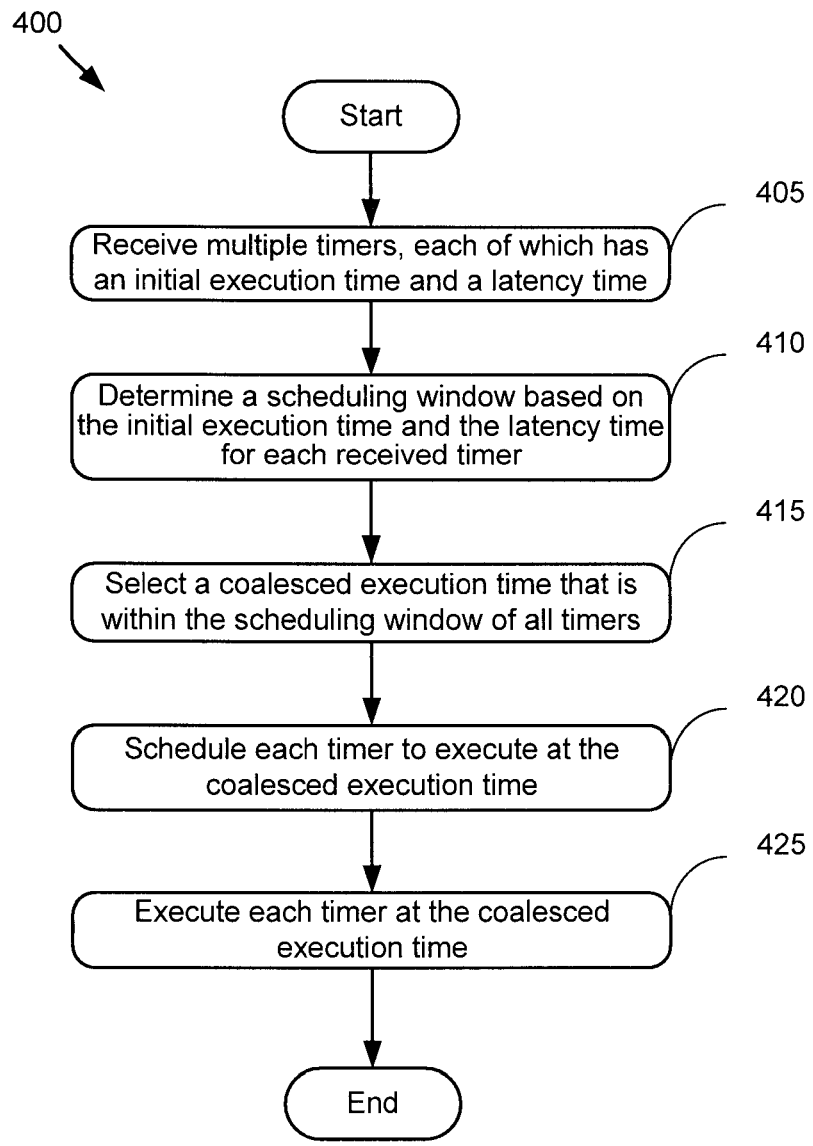
FIG. 4 illustrates a flowchart of one embodiment of a process to coalesce timers based on scheduling windows of the timers.

FIG. 4 illustrates a flowchart of one embodiment of a process 400 to coalesce execution of multiple timers based on scheduling windows of the timers. In one embodiment, the timer management module executes process 400 to coalesce timers based on scheduling windows of the timers. In one embodiment, process 400 uses scheduling windows to determine a coalesced execution time for multiple timers. In FIG. 4, process 400 begins by receiving (at block 405) multiple timers, where each of these timers has an initial execution time and a latency time. In one embodiment, the timer management module assigns latency time to each timer based on the priority of the timer, as described above in FIG. 3.

At block 410, process 400 determines a scheduling window based on the initial execution time and the latency time for each of the received timers. Different timers have different initial execution time and different latency times. In one embodiment, the scheduling window of some timers overlaps with each other in time. For example and in one embodiment, the scheduling windows of the timers 302A-C in FIG. 3 overlap with each other for times between 304C to 304D, inclusive.

At block 415, process 400 selects a coalesced execution time that is within the scheduling window of some or all of the timers. In one embodiment, process 400 selects a coalesced execution time that is within the overlapped scheduling windows of some or all of the received timers. For example and in one embodiment, process 400 selects time 304C of FIG. 3 as the coalesced execution time 310 for timers 302A-C because the time 304C is within the overlapped scheduling windows of the timers 302A-C. Process 400 schedules (at block 420) each timer to execute at the coalesced execution time. For example and in one embodiment, process 400 schedules the timers 302A-C of FIG. 3 to execute at the coalesced execution time 310. At block 425, the process executes each timer at the coalesced execution time. Process 400 then ends.

In one embodiment, process 400 may not be able to find an overlapped scheduling window for all the received timers. In this embodiment, process 400 determines the a subset of the received timers that have an overlapped scheduling window and selects a coalesced execution time within the overlapped time period of the subset of timers. Process 400 schedules the timers in this determined subset to be executed at the coalesced execution time. The timers that are not in the determined subset are left for further scheduling. In one embodiment, Process 400 schedules the timers that are not coalesced to execute at the initial execution time. In another embodiment, process 400 can go through another iteration to find a coalesced execution time for timers that have not been coalesced.

One of ordinary skill in the art will recognize that process 400 is a conceptual representation of the operations used to perform timer coalescing. The specific operations of process 400 may not be performed in the exact order shown and described. The specific operations may not be performed in one continuous series of operations, and different specific operations may be performed in different embodiments. Furthermore, process 400 could be implemented using several sub-processes, or as part of a larger macro process.

An opportunistic execution trigger event is an event that triggers the opportunistic execution of timers, such as a non-timer device interrupt or a processor idle state entry. For example and in one embodiment, an opportunistic execution trigger event is a non-timer device interrupt. As described above, the device interrupt is a signal to the device emitted by hardware or software indicating an event that needs immediate attention. The device responds by suspending its current activities, saving its state, and executing a small program called an interrupt handler (e.g., an ISR) to deal with the event. If the device is under the processor idle state, the device will transition itself to a power mode higher than the processor idle state to handle the event. A non-timer device interrupt is a device interrupt that is not caused by the firing of a timer (e.g., a hardware interrupt). Therefore, it would be useful to opportunistically execute pending timers if the device detects a non-timer device interrupt.

In another embodiment, an opportunistic execution trigger event is a processor idle state entry. It would be useful for the device to opportunistically execute pending timers prior to entering into the processor idle state in order to minimize exits from the processor idle state. In one embodiment, the opportunistic execution of the timers happens immediately before the entering into the processor idle state, which means the opportunistic execution of the timers is the last set of operations performed by the processor before entering into the processor idle state. In another embodiment, there are one or more intervening operations between the opportunistic execution of the times and entering the processor idle state.

Figure 5:
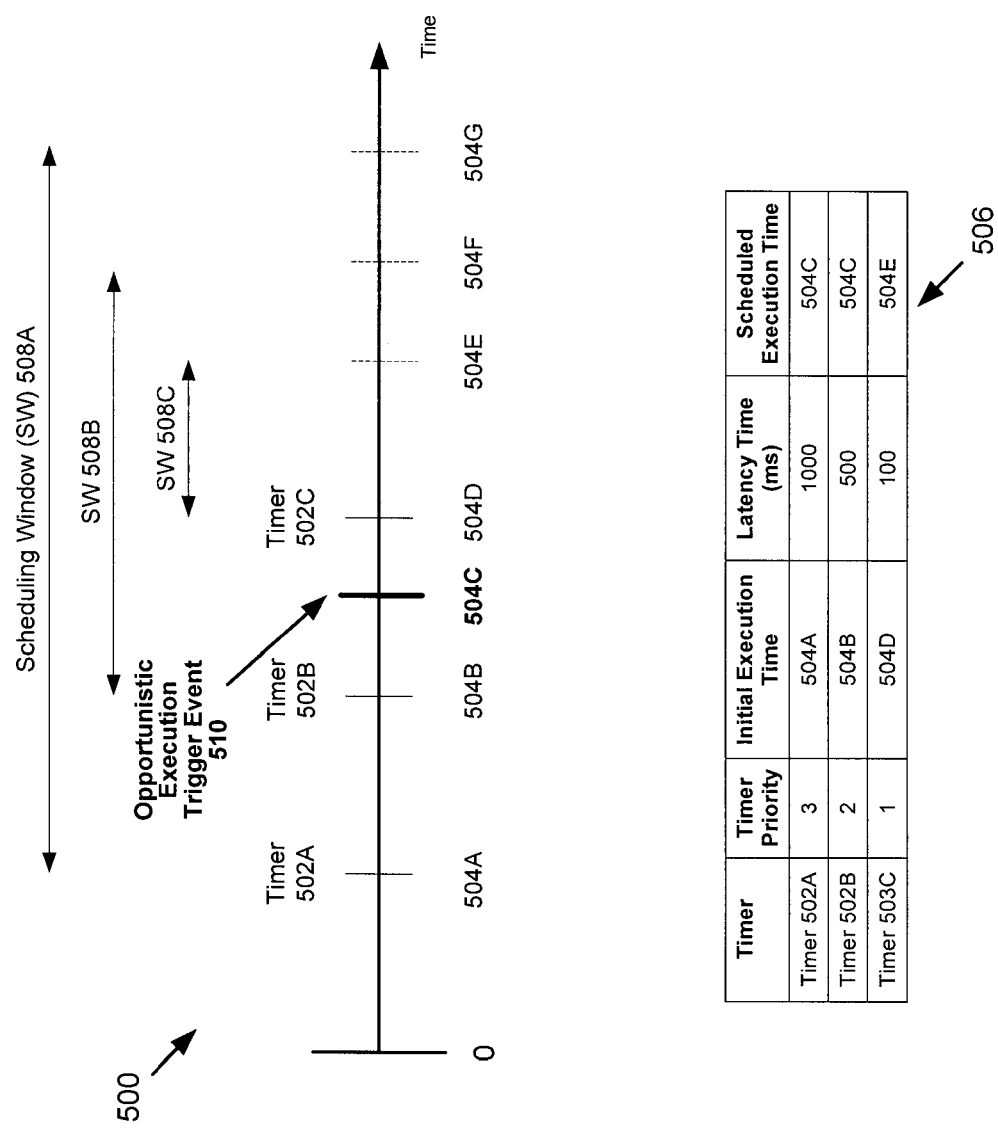
FIG. 5 illustrates in one embodiment coalescing timers by opportunistic execution of timers in response to an opportunistic execution trigger event.

FIG. 5 illustrates a timeline 500 in one embodiment for coalescing timers by opportunistic execution of timers in response to detecting an opportunistic execution trigger event. FIG. 5 identifies several different points of time 504A-G on the timeline 500. As illustrated in the timer attribute table 506, there are three timers 502A-C. Each of these timers 502A-C has a timer priority, an initial execution time, a latency time, and a scheduled execution time. For example, for timer 502A, the timer priority is 3, the initial execution time is 504A, the latency time is 1000 milliseconds, and the scheduled execution time is 504C.

In one embodiment, the timer priority is the priority assigned to the timers and can be based on the priority of the task that the timer is associated with. In another embodiment, the timer priority is not based on the priority of the task that the timer is associated with. In one embodiment, the higher priority a timer has, the smaller value the operating system assigns to that timer as timer priority.

The initial execution time is the time when the timer is initially scheduled to be executed. However, instead of having a fixed execution time for each timer, one embodiment allows each timer to be executed within a scheduling window of the timer. Therefore, a timer can be executed at any time in the timer scheduling window, which is defined by the initial execution time and initial execution time plus the latency time. As shown, the scheduling window 508A for the timer 502A is the time period between 504A and 504G, the scheduling window 508B for the timer 502B is the time period between 504B and 504F, the scheduling window 508C for the timer 502C is the time period between 504D and 504E. In one embodiment, the length of the latency time is determined based on the timer priority. The higher priority the timer has, the shorter the latency time that is assigned to the timer.

Because each timer has a scheduling window to determine the timer execution rather than a fixed execution time, the operating system is able to execute multiple timers when an opportunistic execution trigger event occurs within the scheduling window of these timers. For example and in one embodiment, as illustrated in FIG. 5, if an opportunistic execution trigger event 510 occurs at the time 504C, the timer management module can execute timers 502A and 502B at the time 504C because the time 504C falls within the scheduling windows 508A and 508B. In addition, the timer management module does not execute timer 502C at the time 504C because the time 504C does not fall within the scheduling window 508C of the timer 502C. By coalescing the execution of the timers 502A and 502B in response to detecting the opportunistic execution trigger event 510, fewer interrupts that will cause the processor to exit from its idle state will be invoked. As a result, the device can stay in the low power mode for longer periods of time and power consumption is reduced.

Figure 6:
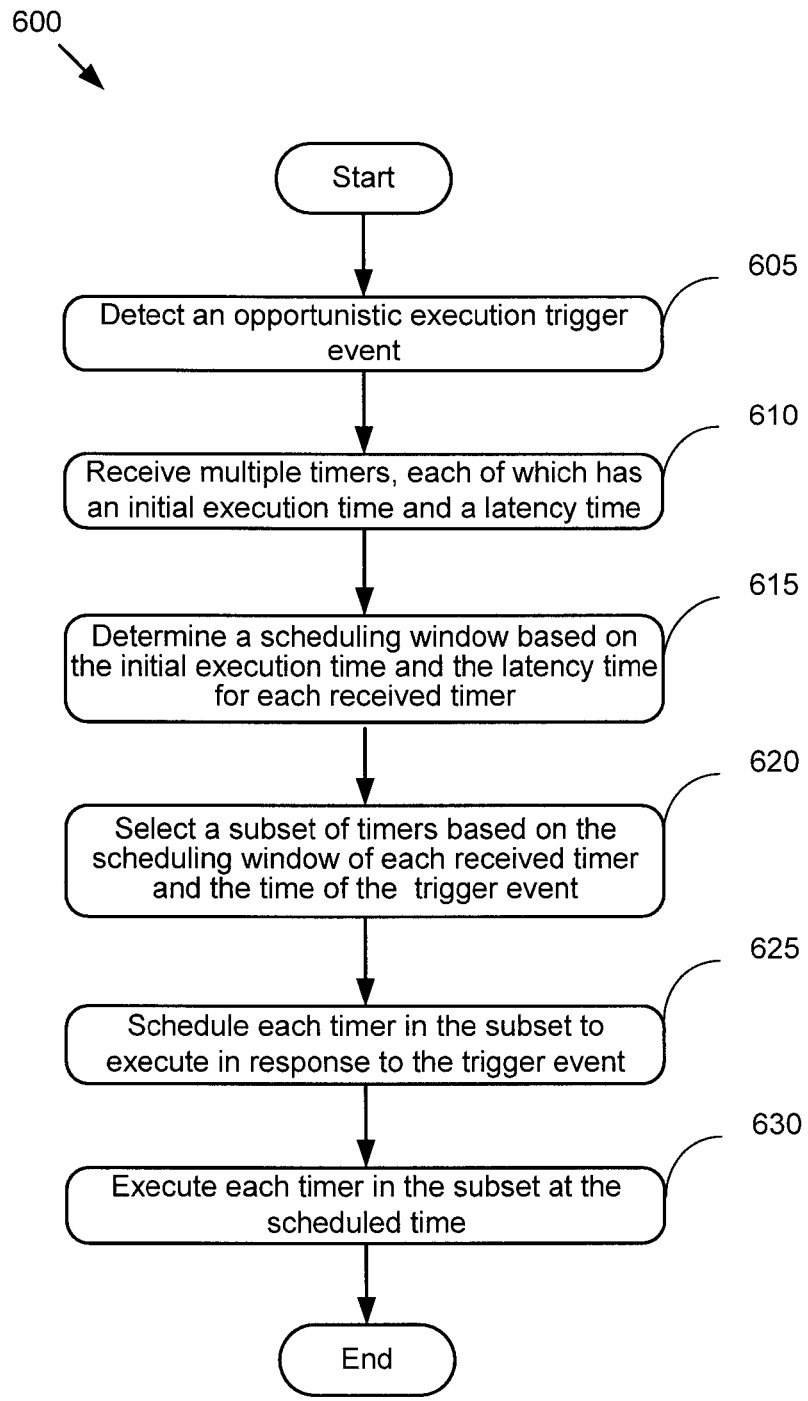
FIG. 6 illustrates a flowchart of one embodiment of a process to coalesce timers by opportunistic execution of the timers in response to detecting an opportunistic execution trigger event.

FIG. 6 illustrates a flowchart of one embodiment of a process 600 to coalesce timers by opportunistic execution of the timers in response to detecting an opportunistic execution trigger event. In one embodiment, the timer management module executes process 600 to execute timers opportunistically based on scheduling windows of the timers. Specifically, FIG. 6 describes a process 600 that selects a subset of timers to execute in response to detecting an opportunistic execution trigger event based on the initial execution time and the latency time for the timers. In FIG. 6, process 600 begins by detecting (at block 605) if an opportunistic execution trigger event has occurred. In one embodiment, this opportunistic execution trigger event is a non-timer device interrupt. In one embodiment, the non-timer device interrupt is a hardware interrupt. For example and in one embodiment, process 600 begins by detecting a key on the keyboard is pressed or a mouse button is clicked. In another embodiment, an opportunistic execution trigger event is a processor idle state entry. In one embodiment, the opportunistic execution of the timers happens immediately before the entering into the processor idle state, which means the opportunistic execution of the timers is the last set of operations performed by the processor before entering into the processor idle state. In another embodiment, there are one or more intervening operations between the opportunistic execution of the times and entering the processor idle state.

At block 610, process 600 receives one or more timers, where each timer has an initial execution time and a latency time. In one embodiment, the timer management module assigns latency time to each timer based on the priority of the timer. For example, as illustrated in the timer attribute table 506 of FIG. 5 above, the latency time of timer 502A is longer than the latency time of timer 502B because timer 502A has a lower priority than timer 502B.

At block 615, process 600 determines a scheduling window based on the initial execution time and the latency time for each received timer. In one embodiment, the scheduling window of a timer is defined as the initial scheduled execution time to the initial scheduled execution time plus the latency time. In this embodiment, different timers can have different initial execution times and different latency times. In one embodiment, the scheduling window of some or all of the timers can overlap with each other in time. For example and in one embodiment, the scheduling windows 508A-C of timers 502A-C in FIG. 5 overlaps with each other between times 504D and 504E and the scheduling windows 508A-B overlap between times 504B through 504E.

At block 620, process 600 selects a subset of timers of the received timers, where the detected opportunistic execution trigger event occurs within the scheduling windows of those timers. In one embodiment, process 600 selects a timer if the opportunistic execution trigger event occurs within the scheduling window of that timer. For example, as illustrated in FIG. 5, process 600 selects timers 502A and 502B because the opportunistic execution trigger event 510 occurs within the scheduling windows 508A and 508B of timers 502A and 502B, respectively. Process 600 schedules (at block 625) each timer in the subset to execute in response to the detection of the opportunistic execution trigger event. For example and in one embodiment, process 600 schedules timers 502A and 502B of FIG. 5 to execute in response to the detection of the opportunistic execution trigger event 510. In one embodiment, process 600 schedules (at block 625) each timer in the subset to execute during the opportunistic execution trigger event. In another embodiment, process 600 schedules (at block 625) each timer in the subset to execute prior to the opportunistic execution trigger event, which means the execution of the subset of timers is the last set of instructions executed by the processor before the occurrence of the opportunistic execution trigger event. At block 630, process 600 executes each timer in the subset at the scheduled execution time.

One of ordinary skill in the art will recognize that process 600 is a conceptual representation of the operations used to perform timer coalescing. The specific operations of process 600 may not be performed in the exact order shown and described. The specific operations may not be performed in one continuous series of operations, and different specific operations may be performed in different embodiments. Furthermore, process 600 could be implemented using several sub-processes, or as part of a larger macro process.

Applications use timers to make provisions for events that occur later. Coalescing timers and opportunistic execution of timers can reduce the chance of the device being interrupted during the low power mode and can further save device power consumption. In one embodiment, the timer management module can rate-limit one or more timers to lessen the frequency a reoccurring timer is executed. In this embodiment, reducing the overall frequency of timer execution can save power consumption and system resources because less frequent timer executions can cause less frequent interrupts for the device.

In one embodiment, the timer management module rate-limits a timer based on the priority of the timer. In one embodiment, the operating system determines the timer priority of each timer based on the task priority of the task associated with the timer. The operating system assigns a high timer priority to a timer when the timer is associated with a high priority task, and assigns a low timer priority to a timer when the timer is associated with a low priority task. For example, real-time tasks have high priorities; therefore the timer management module may not rate-limits timers associated with real-time tasks. On the contrary, the timer management module may rate-limit timers associated with low priority tasks, such as background applications. For example, if a timer is associated with periodically updating the display of an application window (e.g., an animation for the window), when the application window is occluded by another window, the operating system will give a low priority to the timer and rate-limit the execution of the timer in order to save power consumption and system resources.

Figure 7A:
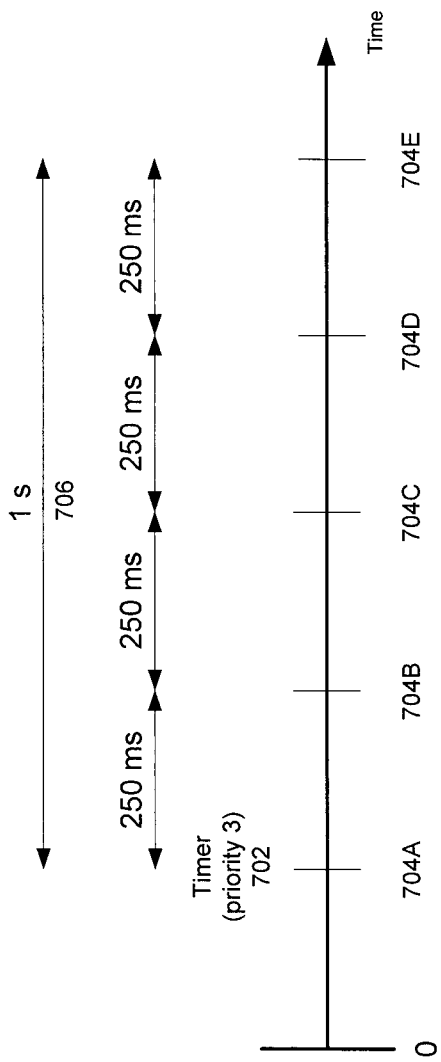
FIGS. 7A and 7B illustrate in one embodiment rate-limiting the execution of timers.
Figure 7B:
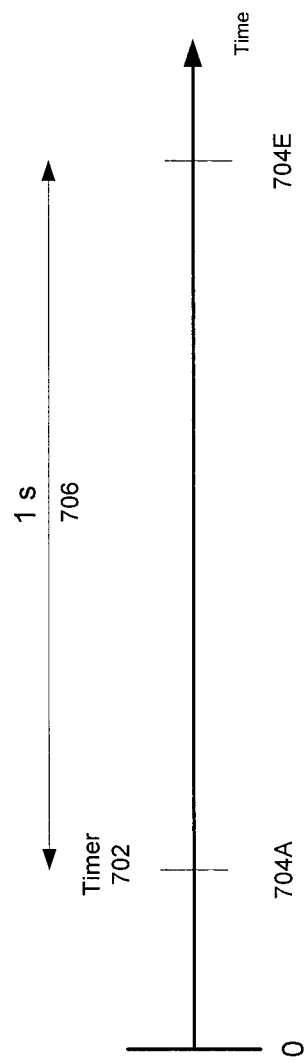

FIGS. 7A and 7B illustrate in one embodiment rate-limiting the execution of a timer. Specifically, FIG. 7A illustrates the execution of a timer without rate-limiting it. As illustrated in FIG. 7A, the timer management module schedules a timer 702 to execute at time 704A and every 250 milliseconds afterwards. Therefore, without rate-limiting the timer 702, the timer management module schedules the timer 702 to execute at times 704A-E. There is a suppression period 706 associated with the timer 702, which is one second long, as illustrated in FIG. 7A. Therefore, the suppression period 706 starts to run at time 704A and ends at time 704E. In one embodiment, the operating system determines the length of the suppression period 706 based on the priority of the timer 702. In this embodiment, the operating system assigns longer suppression periods to timers with low priority so that low priority timers are rate-limited for a longer period of time. In addition, the operating system assigns shorter (or no) suppression periods to timers with high priority so that high priority timers are rate-limited for shorter period of time. Because the timer priority for timer 702 is 3, the operating system assigns a one second suppression period 706 to timer 702, as illustrated in FIGS. 7A and 7B.

FIG. 7B illustrates rate-limiting the execution of the timer based on a suppression period. In one embodiment, the timer management module performs rate-limiting operation on timer 702 and timer 702 does not execute at times 704A-704D as originally scheduled. Instead, timer 702 executes at time 704E, when the suppression period 706 for timer 702 has reached the end. Because of the reduced rate of execution for timer 702, the device is less likely to be disrupted from the low power mode, therefore consumes less power.

Figure 8:
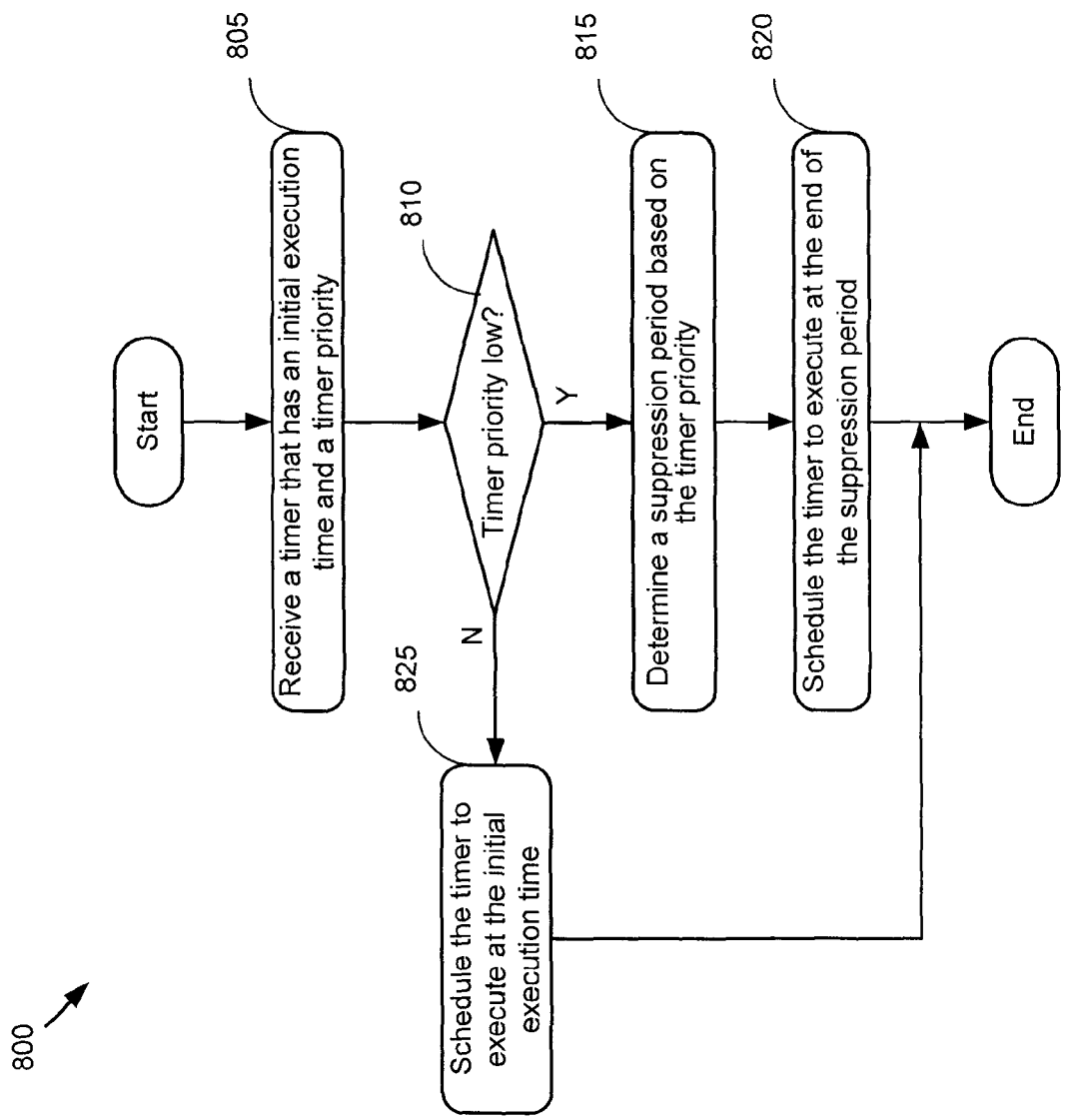
FIG. 8 illustrates a flowchart of one embodiment of a process to rate-limit the execution of a timer.

FIG. 8 illustrates a flowchart of one embodiment of a process 800 to rate-limit the execution of a timer. Specifically, FIG. 8 describes a process 800 that rate-limits the execution of the timer based on a suppression period associated with the timer. In FIG. 8, process 800 begins by receiving (at block 805) a timer that has an initial execution time and a timer priority. For example and in one embodiment, process 800 begins by receiving timer 702 of FIG. 7A that has an initial execution time of 704A and a timer priority of 3.

At block 810, process 800 determines whether the timer priority of the received timer is low enough for the timer management module to rate-limit the execution of the timer. In one embodiment, the timer priority is low when the timer priority satisfies a pre-determined threshold, e.g., the timer priority is greater than a pre-determined value. For example and in one embodiment, process 800 determines that the timer priority is low enough to rate-limit the timer when the timer priority is less than or equal to 3. Because the timer priority of timer 702 in FIG. 7A is 3, process 800 determines that the timer management module should rate-limit the execution of the timer 702. If process 800 determines that the timer priority is not low enough for rate-limiting the timer, process 800 schedules (at block 825) the timer to execute at the initial execution time. Process 800 then ends.

However, if process 800 determines that the timer priority is low enough for rate-limiting the timer, process 800 determines (at block 815) a suppression period based on the timer priority. In one embodiment, the suppression period is a time period for the timer management module to prevent the timer from execution. In one embodiment, the operating system assigns longer suppression periods to timers with low priority so that low priority timers are rate-limited for longer periods of time. The operating system assigns shorter suppression periods to timers with high priority so that high priority timers are rate-limited for shorter periods of time. For example and in one embodiment, process 800 determines that the suppression period 706 for timer 702 should be one second long, as illustrated in FIG. 7B. At block 820, process 800 schedules the timer to execute at the end of the suppression period. For example and in one embodiment, process 800 schedules the timer 702 of FIG. 7B to execute at 704E, which is the end of the suppression period 706. Process 800 then terminates.

One of ordinary skill in the art will recognize that process 800 is a conceptual representation of the operations used to perform timer coalescing. The specific operations of process 800 may not be performed in the exact order shown and described. The specific operations may not be performed in one continuous series of operations, and different specific operations may be performed in different embodiments. Furthermore, process 800 could be implemented using several sub-processes, or as part of a larger macro process.

Figure 9:
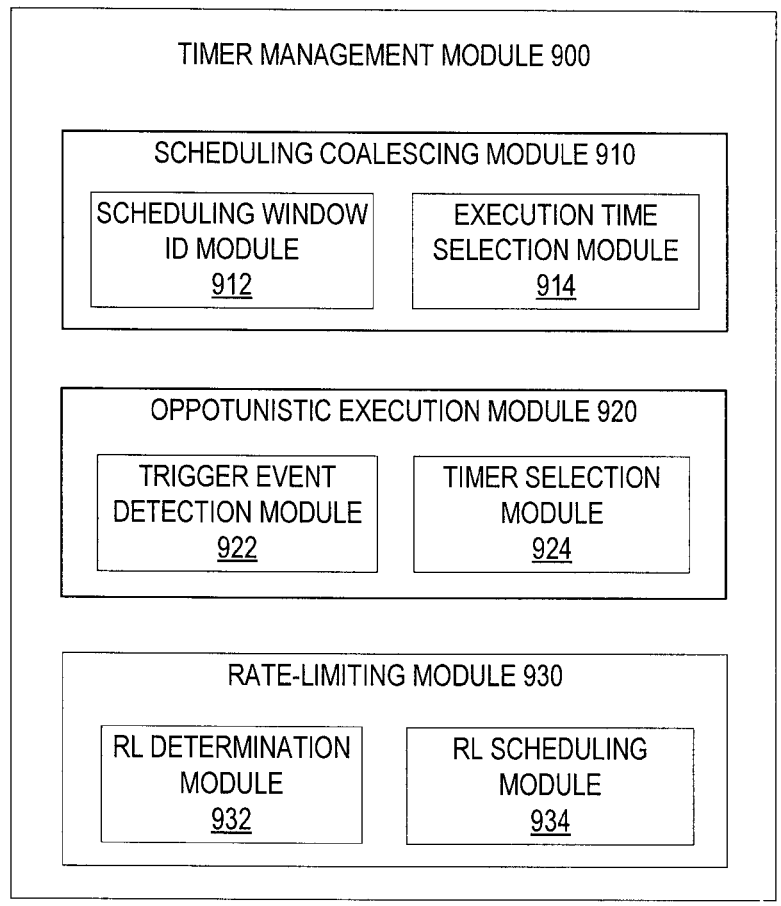
FIG. 9 is a block diagram of the timer management module of one embodiment.

FIG. 9 illustrates a detailed diagram of the timer management module 900 of one embodiment. Specifically, this figure illustrates a set of modules for managing the coalescing, opportunistic executing, and rate-limiting of timers. In one embodiment, the timer management module 900 is used by a kernel of an operating system to facilitate the management of the timers, such as kernel 120 of FIG. 1. As shown in FIG. 9, the timer management module 900 includes a scheduling coalescing module 910, an opportunistic execution module 920, and a rate-limiting module 930.

The scheduling coalescing module 910 receives several timers, identifies scheduling window for each received timer, and coalesces the execution of the timers based on their scheduling window, as described in FIG. 4 above. The scheduling coalescing module 910 includes a scheduling window identification module 912 and an execution time selection module 914. The scheduling window identification module 912 identifies a scheduling window for each received timer based on the initial execution time and the latency time of the timer, as described in FIG. 4, block 410 above. The execution time selection module 914 selects a coalesced execution time for the received timers based on their scheduling windows identified by the scheduling window identification module 912. In one embodiment, the execution time selection module 914 chooses a time within an overlapped time period of all scheduling windows as the coalesced execution time, as described FIG. 4, block 415 above. The scheduling coalescing module 910 schedules each received timer to execute at the coalesced execution time selected by the execution time selection module 914, as described in FIG. 4, block 420 above.

The opportunistic execution module 920 selects a subset of timers to execute opportunistically in response to detecting an opportunistic execution trigger event, as described in FIG. 6 above. The opportunistic execution module 920 includes trigger event detection module 922 and a timer selection module 924.

The trigger event detection module 922 detects the occurrence of an opportunistic execution trigger event, as described in FIG. 6, block 605 above. Once an opportunistic execution trigger event is detected by the trigger event detection module 922, the timer selection module 924 selects a subset from the received timers based on their scheduling windows. In one embodiment, the timer selection module 924 selects those timers that have a scheduling window that contains the time of the detected opportunistic execution trigger event, as described in FIG. 6, block 620 above. The opportunistic execution module 920 schedules the selected subset of timers to execute in response to detecting the opportunistic execution trigger event, as described in FIG. 6, block 625 above.

The rate-limiting module 930 receives a timer and rate-limits the execution of the timer if the timer's priority is low, as described in FIG. 8 above. The rate-limiting module 930 includes a rate-limiting determination module 932 and a rate-limiting scheduling module 934. The rate-limiting determination module 932 determines whether the timer's priority is low enough for the timer management module to perform rate-limiting operation on the timer, as describe in FIG. 8, block 810 above. The rate-limiting scheduling module 934 schedules the execution of the timer based on the determination made by the rate-limiting determination module 932. In one embodiment, if the rate-limiting determination module 932 determines that the timer's priority is low enough for rate-limiting, the rate-limiting scheduling module 934 schedules the timer to execute at the end of a suppression period, as described in FIG. 8, block 820 above. In the same embodiment, if the rate-limiting determination module 932 determines that the timer's priority is not low enough for rate-limiting, the rate-limiting scheduling module 934 schedules the timer to execute at the initial execution time of the timer, as described in FIG. 8, block 825 above.

The timer management module 900 was described above for one embodiment of the invention. One of ordinary skill in the art will realize that in other embodiments this module can be implemented differently. For instance, in one embodiment described above, certain modules are implemented as software modules. However, in another embodiment, some or all of the modules might be implemented by hardware, which can be dedicated application specific hardware (e.g., an ASIC chip or component) or a general purpose chip (e.g., a microprocessor or FPGA).

Figure 10:
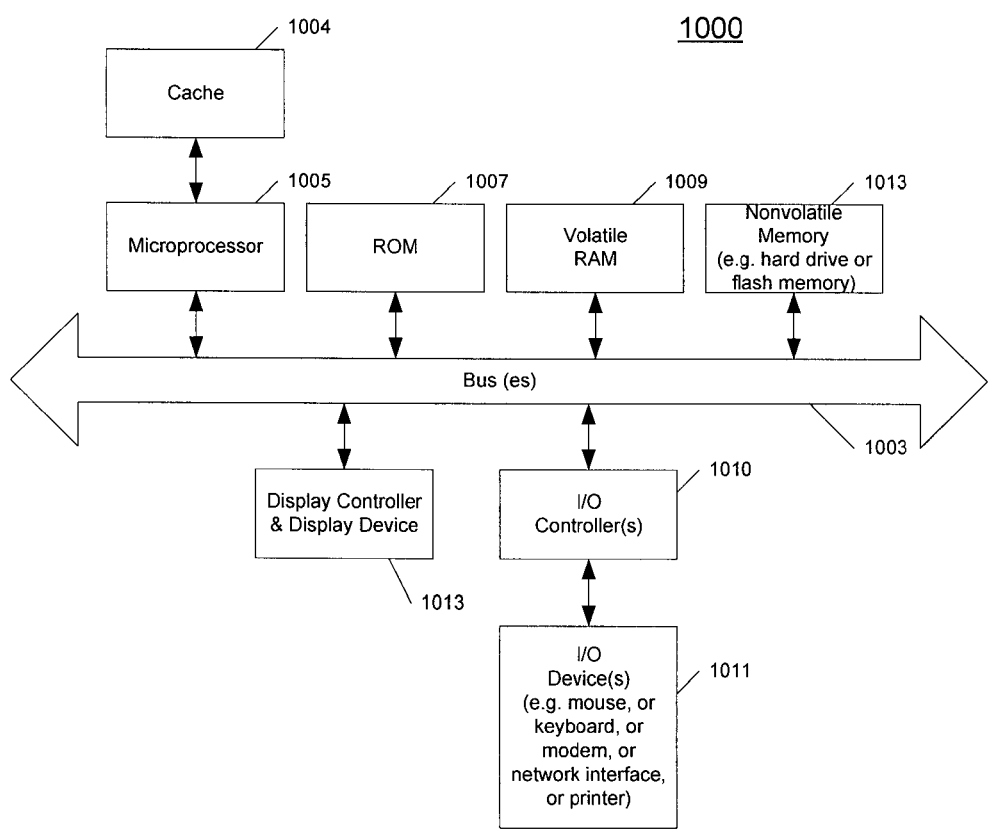
FIG. 10 illustrates one example of a data processing system, which may be used with one embodiment of the present invention.

FIG. 10 shows one example of a data processing system 1000, which may be used with one embodiment of the present invention. For example, the system 1000 may be implemented including a device 100 as shown in FIG. 1. Note that while FIG. 10 illustrates various components of a device, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the device 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1013 and to peripheral devices such as input/output (I/O) devices which may be mice, keyboards, modems, network interfaces, printers and other devices which are well known in the art. Typically, the input/output devices 1015 are coupled to the system through input/output controllers 1017. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Figure 11:
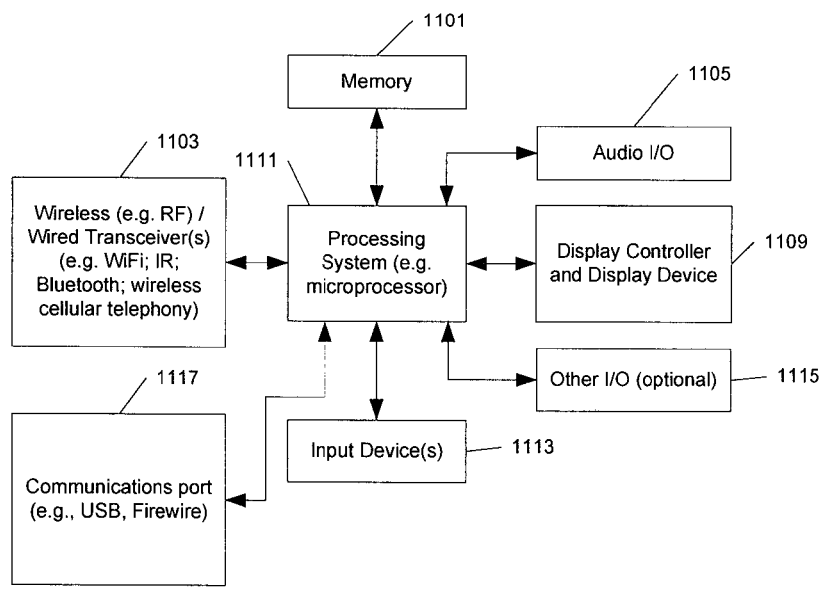
FIG. 11 illustrates one example of another data processing system, which may be used with one embodiment of the present invention.

FIG. 11 shows an example of another data processing system 1100 which may be used with one embodiment of the present invention. For example, system 1100 may be implemented as a device 100 as shown in FIG. 1. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105, which may include a microphone and a speaker, for example, for playing back music or providing telephone functionality through the speaker and microphone.

A display controller and display device 1109 provide a visual user interface for the user; this digital interface may include a graphical user interface which is similar to that shown on a Macintosh computer when running OS X operating system software, or Apple iPhone when running the iOS operating system, etc. The system 1100 also includes one or more wireless transceivers 1103 to communicate with another data processing system, such as the system 1100 of FIG. 11. A wireless transceiver may be a WLAN transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system. The system 1100 further includes one or more communication ports 1117 to communicate with another data processing system, such as the system in FIG. 10. The communication port may be a USB port, Firewire port, Bluetooth interface, etc.

The data processing system 1100 also includes one or more input devices 1113, which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld device or a personal digital assistant (PDA), or a cellular telephone with PDA like functionality, or a handheld device which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1100 may be a network computer or an embedded processing device within another device, or other types of data processing systems, which have fewer components or perhaps more components than that shown in FIG. 11.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone (s), or on the display device, or on both display device and a speaker or earphone(s). Examples of a portable media player are described in published U.S. Pat. No. 7,345,671 and U.S. Pat. No. 7,627,343, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a device bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "selecting," "coalescing," "executing," "setting," "identifying," "detecting," "scheduling," "rate-limiting," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to rate-limit an execution of a timer, the method comprising:
   receiving a timer, wherein the timer includes a periodicity, an execution time based on the periodicity, a timer priority and the timer is a time-driven interrupt source to trigger a periodic activity of an application; and
   if the timer priority is below a threshold, rate-limiting the execution of the timer based on a suppression period derived from the timer priority, wherein there are different suppression periods for different timer priorities and the suppression period is greater than the periodicity of the timer, wherein the rate-limiting the execution of the timer comprises,
      determining the suppression period based on the timer priority, and
      scheduling the timer to execute after the suppression period; and
   if the timer priority at or above the threshold, scheduling the timer to execute at the initial execution time.

2. The non-transitory machine-readable medium of claim 1, wherein the timer priority is below the threshold when the timer is associated with a low priority task.

3. The non-transitory machine-readable medium of claim 1, wherein the timer priority is at or above the threshold when the timer is associated with a high priority task.

4. The non-transitory machine-readable medium of claim 1, wherein the timer is a software timer.

5. The non-transitory machine-readable medium of claim 1, wherein the suppression period is greater than a multiple of the periodicity of the timer.

6. The non-transitory machine-readable medium of claim 1, wherein the suppression period is equal to a multiple of the periodicity of the timer.

7. A device to rate-limit an execution of a timer, the device comprising:
   a processor;
   a memory coupled to the processor though a bus; and
   a process executed from the memory by the processor causes the processor to receive a timer, wherein the timer includes a periodicity, an execution time based on the periodicity, a timer priority and the timer is a time-driven interrupt source to trigger a periodic activity of an application, and if the timer priority is below a threshold, rate-limit the execution of the timer based on a suppression period derived from the timer priority, wherein there are different suppression periods for different timer priorities and the suppression period is greater than the periodicity of the timer, wherein the rate-limiting the execution of the timer comprises, determining the suppression period based on the timer priority, and scheduling the timer to execute after the suppression period, and if the timer priority at or above the threshold, schedule the timer to execute at the initial execution time.

8. The device of claim 7, wherein the timer is a software timer.

9. The device of claim 7, wherein the timer priority is below the threshold when the timer is associated with a low priority task.

10. The device of claim 7, wherein the timer priority is at or above the threshold when the timer is associated with a high priority task.

11. The device of claim 7, wherein the suppression period is greater than a multiple of the periodicity of the timer.

12. The device of claim 7, wherein the suppression period is equal to a multiple of the periodicity of the timer.

13. A computer implemented method for rate-limiting an execution of a timer, the method comprising:
   receiving a timer, wherein the timer includes a priority, an execution time based on the periodicity, a timer priority and the timer is a time-driven interrupt source to trigger a periodic activity of an application; and
   if the timer priority is below a threshold, rate-limiting the execution of the timer based on a suppression period derived from the timer priority, wherein there are different suppression periods for different timer priorities and the suppression period is greater than the periodicity of the timer, wherein the rate-limiting the execution of the timer comprises,
      determining the suppression period based on the timer priority, and
      scheduling the timer to execute after the suppression period; and
   if the timer priority at or above the threshold, scheduling the timer to execute at the initial execution time.

14. The method of claim 13, wherein the timer priority is below the threshold when the timer is associated with a low priority task.

15. The method of claim 13, wherein the timer priority is at or above the threshold when the timer is associated with a high priority task.

16. The method of claim 13, wherein the suppression period is greater than a multiple of the periodicity of the timer.

17. The method of claim 13, wherein the suppression period is equal to a multiple of the periodicity of the timer.

* * * * *